UNITED STATES PATENT OFFICE.

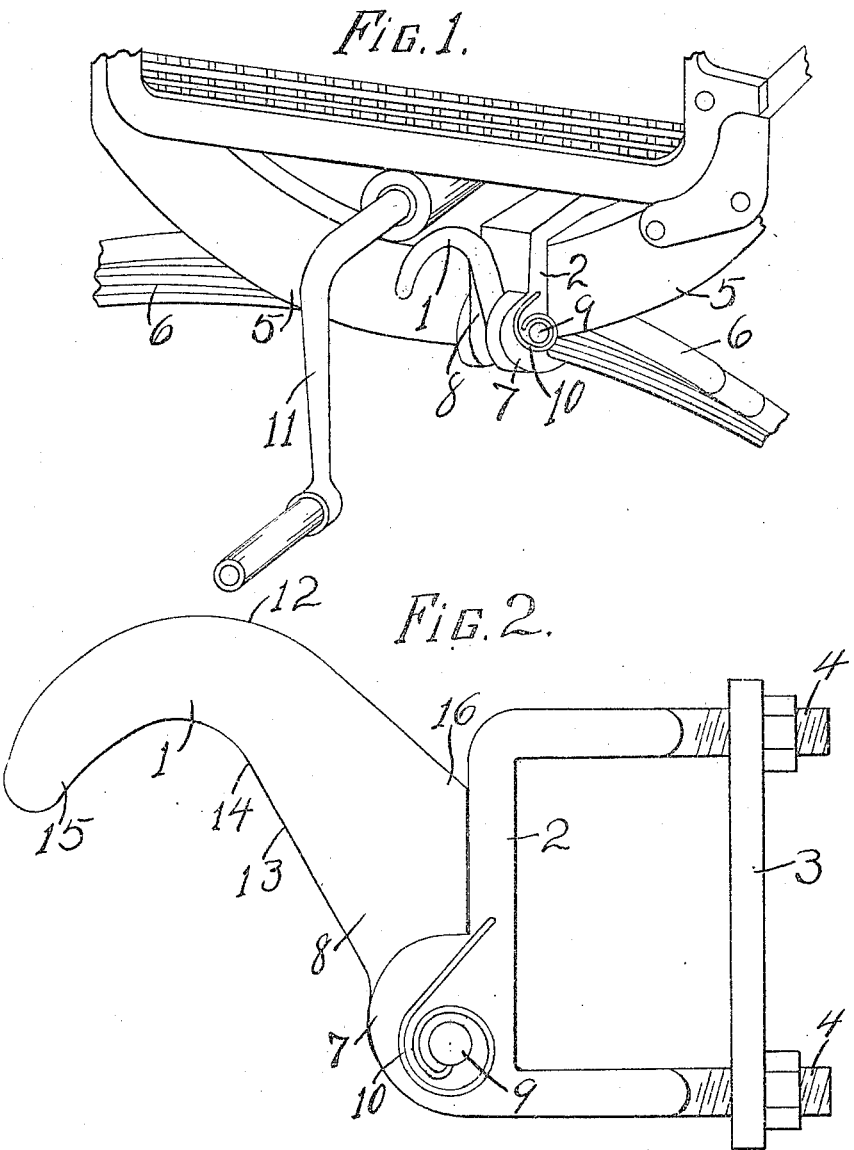

HERMAN P. MILLER, OF FORT WORTH, TEXAS, ASSIGNOR OF FIFTY-FIVE ONE-HUNDREDTHS TO W. H. LOGAN, OF FORT WORTH, TEXAS.

ANTIKICKING DEVICE FOR AUTOMOBILES.

1,219,759.

Specification of Letters Patent.

Patented Mar. 20, 1917.

Application filed October 9, 1916. Serial No. 124,543.

*To all whom it may concern:*

Be it known that I, HERMAN P. MILLER, a citizen of the United States, residing at Fort Worth, in the county of Tarrant and State of Texas, have invented certain new and useful Improvements in Antikicking Devices for Automobiles, of which the following is a specification.

My invention relates to anti-kicking device or catch to prevent injury of a person or to prevent breaking parts of an automobile which requires "cranking" when the automobile is to be started; and the object is to provide a simple device which is relatively inexpensive and which can be mounted at a convenient location on the car to catch the crank when the car "kicks" and which will be automatic in action. Other objects and advantages will be fully explained in the following description and the invention will be more particularly pointed out in the claim.

Reference is had to the accompanying drawings which form a part of this application.

Figure 1 is a perspective view of a portion of an automobile and a perspective view of the improved catch. Fig. 2 is a side elevation of the catch or hook and the yoke for mounting the same.

Similar characters of reference are used to indicate the same parts throughout the several views.

The hook or catch 1 is mounted on the automobile by means of a yoke in two parts 2 and 3, the part 2 being substantially rectangular with the ends 4 threaded to receive nuts 4 for retaining the yoke on the brace 5 and the springs 6 of the automobile. The yoke will thus be rigid with the brace 5 and the springs 6 and will serve as a brace for the automobile. The yoke has a boss 7 which is slotted to receive the shank 8 of the hook 1. The shank 8 is pivotally connected to the yoke by a pivot bolt 9 which is rigid with the shank 8. The hook 1 is retained and brought to normal position by an involute spring 10 which has one end secured to the pivot bolt 9 and the other end secured to the part 2 of the yoke in such position that the spring will not be struck by the crank 11 of the automobile. In operation the crank 11, when being turned to crank the automobile, will strike the upper part 12 of the hook which is sufficiently curved to allow the crank 11 to slide thereon and the hook will readily yield downwardly as the crank 11 is turned so that the hook 1 will swing downwardly on its pivot bolt to let the crank pass. As soon as the crank 11 passes the tip of the hook 1, the hook will be brought back to normal position by the spring 10. The hook must stand in the position illustrated in the drawings to catch the crank in case of kicking by the automobile so that the crank will not turn violently backward and strike the operator's hand or arm. The shank 8 has a slanting surface 13 which performs a useful function. When the crank 11 strikes the slanting surface 13, the clutch of the crank 11 will be forced forward and thus the clutch will be drawn out of the position for cranking the car. The hook is made sufficiently strong from the point 14 to the point 15 to sustain any strain that may be thrown against it by the crank 11. The hook 1 will thus catch and hold the crank 11 if this crank ever turns backward or kicks.

Various changes in the sizes, proportions, and construction and arrangement of the several parts may be made without departing from my invention. The shoulder 16 serves to resist the backward movement of the hook. If the automobile kicks, the crank 11 will strike the slanting surface 13 and as the hook cannot move backward on account of the shoulder 16 bearing against the yoke 2, the crank will be forced forward from the front of the car and this will draw the clutch out of operative position.

What I claim, is,—

A safety device for automobiles comprising a hook and means for mounting said hook yieldingly in the path of the automobile crank, said hook being adapted to yield to the automobile crank in the forward turning of the crank but adapted to catch and stop the crank when the crank is turned backwardly and said hook having a slanting surface for automatically drawing the crank out of operative position.

In testimony whereof, I set my hand, this 4th day of October, 1916.

HERMAN P. MILLER.